No. 654,040. Patented July 17, 1900.
A. G. WILKINS.
CLAMP FOR PATCHING OR COUPLING HOSE.
(Application filed Apr. 18, 1900.)
(No Model.)
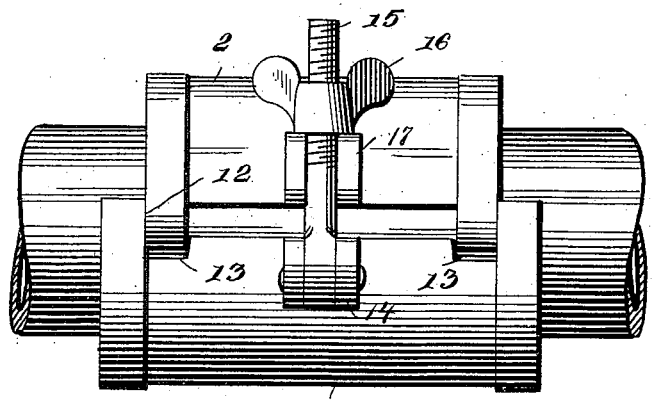
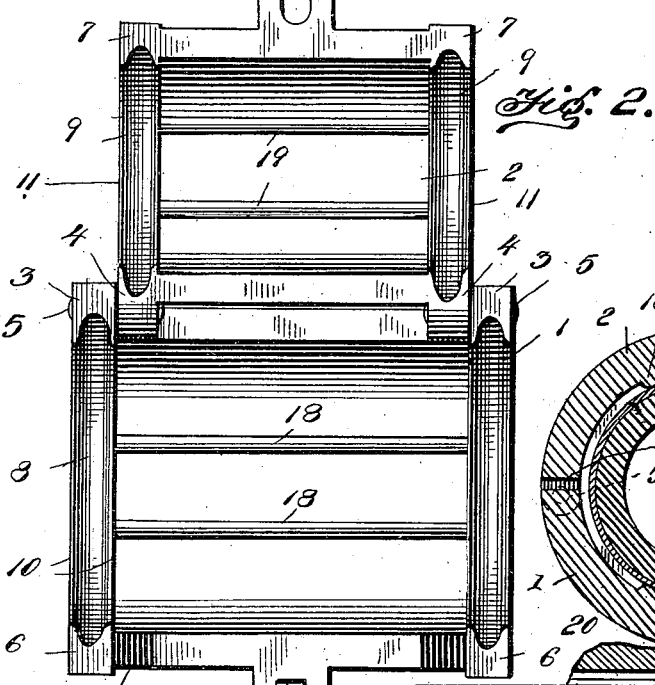
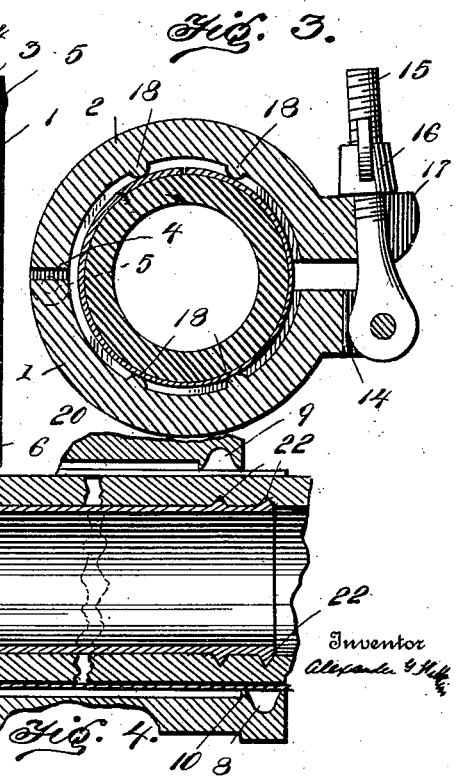
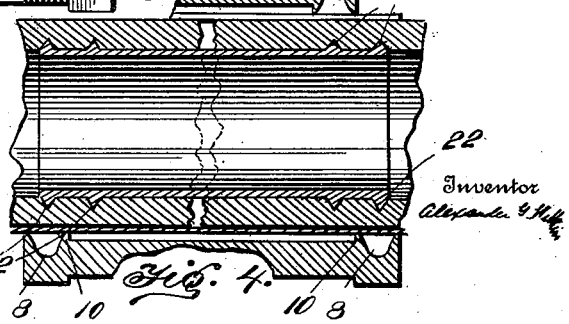

UNITED STATES PATENT OFFICE.

ALEXANDER G. WILKINS, OF MEADVILLE, PENNSYLVANIA, ASSIGNOR OF ONE-HALF TO ANDY L. DUNBAR, OF SAME PLACE.

CLAMP FOR PATCHING OR COUPLING HOSE.

SPECIFICATION forming part of Letters Patent No. 654,040, dated July 17, 1900.

Application filed April 18, 1900. Serial No. 13,366. (No model.)

*To all whom it may concern:*

Be it known that I, ALEXANDER G. WILKINS, a citizen of the United States, residing at Meadville, in the county of Crawford and State of Pennsylvania, have invented certain new and useful Improvements in Clamps for Patching or Coupling Hose; and I do hereby declare the following to be a full, clear, and exact description of the invention, such as will enable others skilled in the art to which it appertains to make and use the same.

My invention relates to improvements in clamps for patching or coupling hose; and it consists in a clamp comprising sections hinged together at one edge and adapted to be drawn together at the other edge, ribs or projecting flanges formed at the edge of said sections for gripping the hose, and longitudinally-arranged ribs for further grasping the hose, whereby a leak or a broken portion of hose may be mended or put together.

It also consists in certain other novel constructions, combinations, and arrangements of parts, as will be hereinafter fully described and specifically claimed.

In the accompanying drawings, forming a part of this specification, Figure 1 represents a side elevation of a section of a piece of hose or pipe having my improved clamp applied thereto. Fig. 2 represents a plan view of the clamp with its sections spread open. Fig. 3 represents a transverse cross-section through the clamp and the hose to which it is applied. Fig. 4 shows a longitudinal sectional view through a piece of hose-pipe, showing the use of a clamp and an inner thimble for securing the ends of broken hose-pipe together.

My invention is designed particularly for use in connection with air-brake pipes which require exceedingly-effective clamps to mend leaks, holes, or breaks which may occur in them. I do not wish, however, to be limited in using the said device for air-brake pipes, as it is applicable to any kind of hose, either for retaining air or water within the same.

My improved hose-clamp comprises hinged sections, as 1 and 2, which are provided at one edge, respectively, with projecting lugs 3 3 and 4 4, through which pivot pins or bolts, as 5, may be passed, as seen in Fig. 2 of the drawings, to secure the parts together. Each section 1 and 2 is provided upon its ends with circumferential ribs or flanges, as 6 6 and 7 7. These edge flanges are provided upon their inner concaved surfaces with grooves, as 8 and 9, forming two inwardly-gripping flanges or ribs, as 10 and 11. When the parts are clamped together upon a hose, these ribs will grip the material of the hose very firmly. The flanges 6 and 7 project beyond the sections 1 and 2 at their free meeting edges, so that they will telescope or lap past one another, as seen at 12 in Fig. 1. The section 1 is provided with recessed portions, as at 13 13, to accommodate the ends of the flanges 7. The free edge of the section 1 is provided with a bifurcated projection 14, to which is pivotally secured a bolt, as 15, having a clamping thumb-nut, as 16, working thereon. The bolt is adapted to engage a bifurcated projection 17, secured to the free edge of the section 2, so that when the parts are brought together, as seen in Figs. 1 and 3 of the drawings, and the nut 16 is screwed upon the bolt 15 the clamp may be drawn tightly around the hose which it is inclosing. The sections are further provided with longitudinally-arranged inwardly-projecting ribs, as 18 and 19, which also engage the hose or pipe and serve to further prevent the leakage which might otherwise occur at a mended point in the hose.

As an additional security in mending a hole or break in a hose, I contemplate wrapping the hose with a piece of rubber or rubber fabric, as 20, before placing the clamp in position. In using this piece of rubber its free meeting or lapping edges are preferably arranged between the longitudinal ribs 18 18 or 19 19, so that any leakage between the ribs could not get past them. My clamp may also be very effective for securing the ends of hose-pipes together by using an internal thimble, as 21. (Illustrated in Fig. 4 of the drawings.) Such a thimble I usually provide with peripheral flanges or ribs, as 22 22, near its ends and upon its outer surface. When the thimble is inserted in the broken ends of a hose and the clamp is brought together around the outer surface of the hose, it will be firmly pressed against the ribs 22 and will not only hold the parts together, but will prevent any leakage past the said ribs.

It will be apparent that my improved clamp is well adapted for all kinds of breaks and apertures which are likely to occur in hose-piping and that a break or hole may be effectively stopped by the application of the clamp to the affected part.

Having thus described my invention, what is claimed as new, and desired to be secured by Letters Patent, is—

1. A clamp for hose or flexible pipe comprising separate sections having inwardly-projecting annular end flanges and longitudinal flanges of similar depth connecting said end flanges, and means for clamping the sections together and pressing said annular and end flanges into the hose or piping, whereby a leak therein may be stopped, substantially as described.

2. A clamp for mending piping, comprising sections having end flanges, the said flanges projecting so as to lap each other, pins or bolts passed through the lapping ends so as to pivotally secure the sections together, grooves formed upon the inner surfaces of the said end flanges forming gripping-ribs, the free ends of said flanges also lapping, and means for drawing the free edges of the sections together consisting of a clamping-bolt, and means upon the sections for engaging the same.

3. A clamp for mending hose-pipes, comprising sections having end flanges, pivot-pins securing the said flanges together, grooves formed upon the inner faces of the flanges for producing gripping-ribs, longitudinal gripping-ribs arranged internally of the said sections and extending from one end flange to the other, a bolt for clamping the parts together, a rubber cloth for further stopping a break or aperture in a hose-pipe the said cloth being arranged with its meeting or lapping edges located between the longitudinally-arranged gripping-ribs, the construction being such that the gripping-ribs of the clamp-sections will hold the rubber cloth tightly upon the hose.

4. A clamp for coupling the ends of broken hose-pipes, comprising segmental sections hinged together at one edge and lapping at the other edges, a bolt for drawing the free edges together, a thimble adapted to be inserted in the hose ends, said thimble having peripheral ribs, internal ribs arranged in the clamp-sections adapted to fit over the ribs in the pipe-thimble, the construction being such that when the clamp is secured in place it will grip the hose upon the thimble and securely join the parts together without danger of leakage, substantially as described.

In testimony whereof I hereunto affix my signature in presence of two witnesses.

ALEXANDER G. WILKINS.

Witnesses:
L. W. OHLMAN,
G. N. HOPKINS.